(12) United States Patent
Ben

(10) Patent No.: US 8,632,542 B2
(45) Date of Patent: Jan. 21, 2014

(54) BONE DISTRACTION SYSTEM

(76) Inventor: Rafael Ben, Santo Domingo (DO)

( * ) Notice: Subject to any disclaimer, the term of this patent is extended or adjusted under 35 U.S.C. 154(b) by 156 days.

(21) Appl. No.: 13/050,579

(22) Filed: Mar. 17, 2011

(65) Prior Publication Data

US 2011/0230882 A1 Sep. 22, 2011

Related U.S. Application Data

(60) Provisional application No. 61/315,420, filed on Mar. 19, 2010.

(51) Int. Cl.
*A61B 17/66* (2006.01)

(52) U.S. Cl.
USPC .......................................................... 606/57

(58) Field of Classification Search
USPC ............. 606/54, 55, 57, 58, 59, 282, 90, 105; 403/345
See application file for complete search history.

(56) References Cited

U.S. PATENT DOCUMENTS

| | | | | |
|---|---|---|---|---|
| 4,922,896 A | * | 5/1990 | Agee et al. ........................ | 606/55 |
| 4,973,331 A | * | 11/1990 | Pursley et al. .................... | 606/54 |
| 5,643,258 A | * | 7/1997 | Robioneck et al. .............. | 606/54 |

\* cited by examiner

*Primary Examiner* — Pedro Philogene
*Assistant Examiner* — David Comstock
(74) *Attorney, Agent, or Firm* — Luis Figarella

(57) ABSTRACT

A multi-plane bone distraction system including an elongated member with an anchor, slot, rail and anchoring means for use as a distraction device in cutting and either lengthening or shortening a bone. The system is capable of being anchored to one or more bones.

8 Claims, 7 Drawing Sheets

BONE DISTRACTION SYSTEM

CROSS-REFERENCE TO RELATED APPLICATIONS

This application claims priority to U.S. provisional patent application Ser. No. 61/315,420 titled "Bone Distraction System" filed on Mar. 19, 2010, the disclosure of which is herein incorporated by reference in its entirety.

PATENTS CITED

The following documents and references are incorporated by reference in their entirety, Rayhack et al (U.S. Pat. Nos. 6,007,535 and 4,929,247), Rezach et al (U.S. Pat. No. 7,578,822), Cramer et al (U.S. Pat. No. 4,096,857), Orbay et al (U.S. Pat. No. 7,780,711) and Helland (U.S. Pat. No. 6,203,548).

DESCRIPTION OF THE RELATED ART

There are a number of systems for dealing with bone distraction and osteogenesis. They tend to work in either tension or compression, preferably in two or more dimensions. Some allow for the lengthening of the bone by distracting the ends of the bones apart by a desired distance and securing the ends of the bone at the desired distance while inserting a bone segment in the gap between the ends of the bone to facilitate the growth of the bone across the gap. In other cases, the desire is to re-arrange the shape of the bone by lengthening or otherwise adjusting their structure.

Some of the current designs may be used both as a compression and a distraction device. These include work such as Rayhack et al (U.S. Pat. Nos. 6,007,535 and 4,929,247), Rezach et al (U.S. Pat. No. 7,578,822), Cramer et al (U.S. Pat. No. 4,096,857), Orbay et al (U.S. Pat. No. 7,780,711) and Helland (U.S. Pat. No. 6,203,548), the specifications of which are incorporated by reference here in their entirety.

A number of disadvantages are noted in many of the systems in the market. These include, among others, the utilization of bone screws that engage only through one cortex of the bone, or are generally positioned substantially off-axis from the longitudinal axis of the bone that is being compressed or distracted thereby increasing the potential for bending or toggling of the bone screw to occur during the use of excessive force in the adjustment means.

Others have adjustment assembly means that require the use of a pin, claw or discrete slotted plate. Many use extensively expensive materials, such as stainless steel and/or other rare metals. In addition, it is well known in the medical arts, that a distraction rate of about 1 mm per day is optimal for most patients. But performing such a gradual change is hard for patients without the correct calibration devices.

Many of the devices disclosed in the above-referenced patents do not provide for the gradual adjustment by the user to either compression or distraction of a bone. When both compression and distraction capabilities are not present in the device, the inserting of a bone segment in order to lengthen the bone becomes difficult since the ends of the bone cannot be compressed to retain the bone segment there between. As well, re-cutting or reshaping of the ends of the bones is difficult to accomplish without having both distraction and compression capabilities.

In particular, a major disadvantage of almost all the previous systems, is the requirement that all adjustment be performed by trained technicians or physicians. In the developing world, where distances traveled to see a clinician may be measured in fractions of a day (if not multiple days), this can lead to post-procedure complications.

There is a need for a composite device that will provide the ability to provide for multiple axes, multiple location compression and/or distraction of a bone; while providing the ability to distract, compress and/or reposition in multiple planes. Having the therapy performed by the patients would be a plus.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention comprises a distraction system comprising a significantly rigid elongated member having openings and pin securing means for anchoring to surgical pins near its proximal end and one or more slots along its length, one or more non-rotating rails secured to said elongated member, slightly offset to one side but significantly along the length of one or more of said slots, one or more carriages secured to one or more rails, said carriages having openings and securing means for attaching to one or more surgical pins and one or more carriage displacement control means per carriage.

In another aspect the pin securing means are comprised of set screws, the carriage displacement means are comprised of nuts and the rail and nut threads are selected so that half a rotation corresponds to a 1 mm linear advance by the carriage. In another aspect, the carriage displacement means are comprised of wing nuts. In yet another aspect, the carriage displacement means are comprised of an electromechanical assembly with electronic controls.

In another aspect one or more secondary elongated structure protruding from the first, said secondary members being significantly rigid and having openings and securing means for anchoring to surgical pins near their distal ends.

In another aspect, the invention is a method for providing bone distraction comprising providing a significantly rigid elongated member having openings and pin securing means for anchoring to surgical pins near its proximal end and one or more slots along its length, providing one or more non-rotating rails secured to said elongated member, slightly offset to one side but significantly along the length of one or more of said slots, providing one or more carriages secured to one or more rails, said carriages having openings and securing means for attaching to one or more surgical pins and providing one or more carriage displacement control means per carriage.

Other features and advantages of the present invention will become apparent upon examining the following detailed description of an embodiment thereof, taken in conjunction with the attached drawings.

DETAILED DESCRIPTION OF THE PREFERRED EMBODIMENT

To provide an overall understanding of the invention, certain illustrative embodiments will now be described, including apparatuses, devices, systems and/or methods. However, it will be understood by one of ordinary skill in the art that the apparatuses, devices, systems and/or methods described herein may be adapted and modified as is appropriate for the application being addressed and that the systems and methods described herein may be employed in other suitable applications, and that such other additions and modifications will not depart from the scope hereof.

Figure 1:
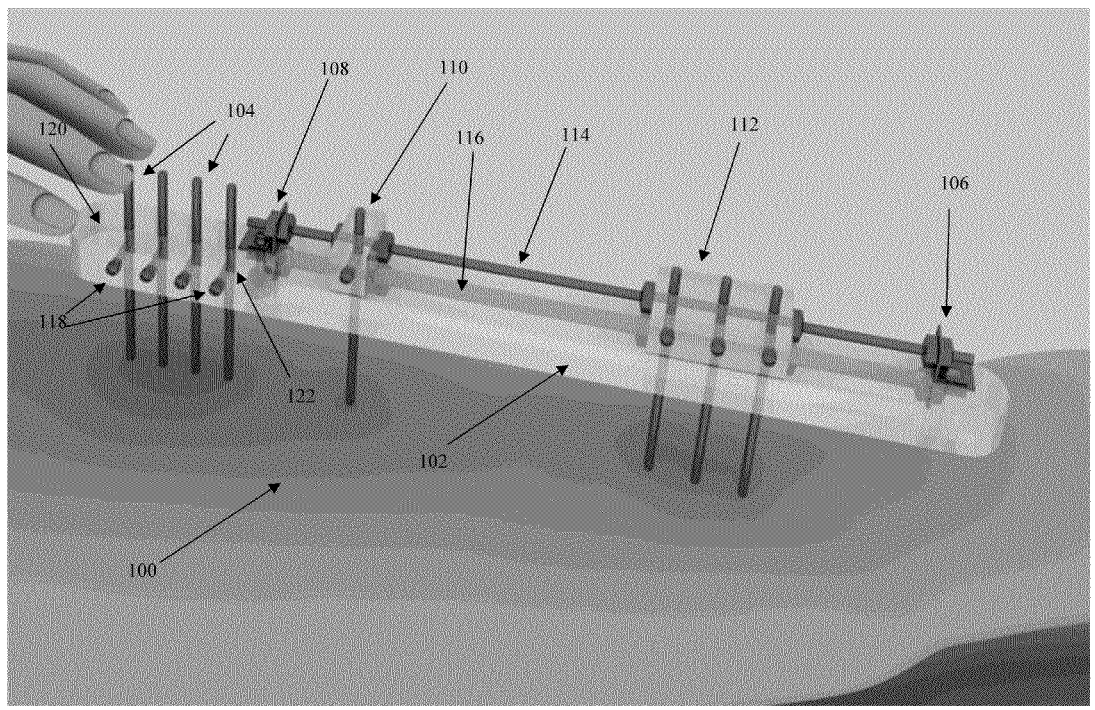
FIG. 1 shows an illustration of an exemplary embodiment of the invention.

Distraction osteogenesis, also called callus callotasis, distraction, or osteodistraction is a surgical process used to reconstruct skeletal deformities and shorten or lengthen bones in the body. Distraction osteogenesis has the benefit of simultaneously increasing bone length and the volume of surrounding soft tissues. FIG. 1 illustrates one exemplary embodiment of the invention. In it, we see the overall system 100.

The primary support member is an elongated primary member 102 (p-member), along whose surface the other subsystems are secured and operate. This surface is critical in providing a reference datum along which the distraction forces (be they in tension or compression) are effected. In one embodiment, the p-member 102 is comprised of a material such as plastic (be it a thermoplastic or thermosetting polymer (examples of these include polyethylene, polystyrene, polyvinyl chloride and polytetrafluoroethylene (PTFE). These would include materials such as nylon, Plexiglas, and others). In an alternate embodiment, the p-member may be comprised of a carbon composite, metal, wood, bone or any composite thereof, or any material capable of supplying a sturdy, stable and cost effective surface and member capable of transferring a moment of inertia from an anchor to a point in space.

In one embodiment, at one end, the elongated member or p-member 102 has the ability to be securely fastened to one or more percutaneous surgical anchor pins 104 or other such anchors attached to the patient's body. The p-member body 102 has openings 122 along all or part of its body to allow for the fastening and securing of the p-member to surgical pins. While shown in the proximal end, in alternate embodiments, said openings are located along any part of its body, including the distal end. The angle and height over the patient skin or epidermis may be adjusted by setting the set screws 118 or similar surgical pins securing means, which would press on the pins 104, and fix the height of the p-member along the length of one or more of the pin 104.

In one embodiment, the attachment to the surgical pins is made using any of the well known alternatives to the set screw 118, these include chemical bonding (such as glues, epoxy and others), dowel pins, sockets and others. In one embodiment, these set screws 118 are made of stainless steel, but other materials such as plastic (including nylon), and others may be used.

The area at the proximal end, is in one embodiment used to attach the anchor surgical pins 104 to the p-member 102, and called the anchor area 120. It anchors the p-member to the patient. In one embodiment, we desire this anchoring to align the p-member surface in approximate parallel to the patient. In an alternate embodiment, the set screws 118 and openings for the pins 104 may be offset in order to give make that angle from 0 to approximate 89 degrees, by adjusting the angle of the opening hosting the pins 104, and setting them at various heights.

In one embodiment, the height of each successive set pin is lower or higher, allowing the projection of the p-member over the skin to pitch up or down. The use of two or more anchor pins 104 provides p-member longitudinal axis stability along the longitudinal axis defined by the length of the p-member 102. In most cases, a small angle of elevation of the p-member 102 may be accomplished by the above adjustment. When a more severe angle is desired, the opening 122 along the height of the p-member 102 may be angled (to the desired resulting angle over the epidermis of the patient), equipped with rotational sockets (so that they each may adjust to an angle of the anchor pin 104 and then secured by the anchor pin securing means), or even widened and filled with epoxy or other chemical securing means once the desired angle is achieved.

Traveling farther along the body of the p-member, one or more longitudinal or lengthwise openings, slits or slots 116, are created clear across the member 102. Said slots allow the passing of the one or more surgical pins that connect to the one or more carriages (110, 112) that ride along the rail 114 secured to the p-member. In one embodiment, the slot(s) run significantly straight along the length of the member, slightly offset to one side of it. In an alternate embodiment, they are shaped in the form of a curve or other device, conforming to the shape of the rail 114 above it.

in allowing for the compression or distraction of the bone structure attached to the carriage(s) through the carriage attachment pins. In one embodiment, the rail is a long threaded bolt or screw attached or secured to the p-member at either end (106, 108), so that the rail may not rotate. In alternate embodiments, the rail 114 is comprised of any elongated tubular structure capable of allowing for secure attachment of one or more carriages, and their controlled displacement along the length of the rail 114, such as acme screws, threaded rods, rods, and others.

Figure 2:
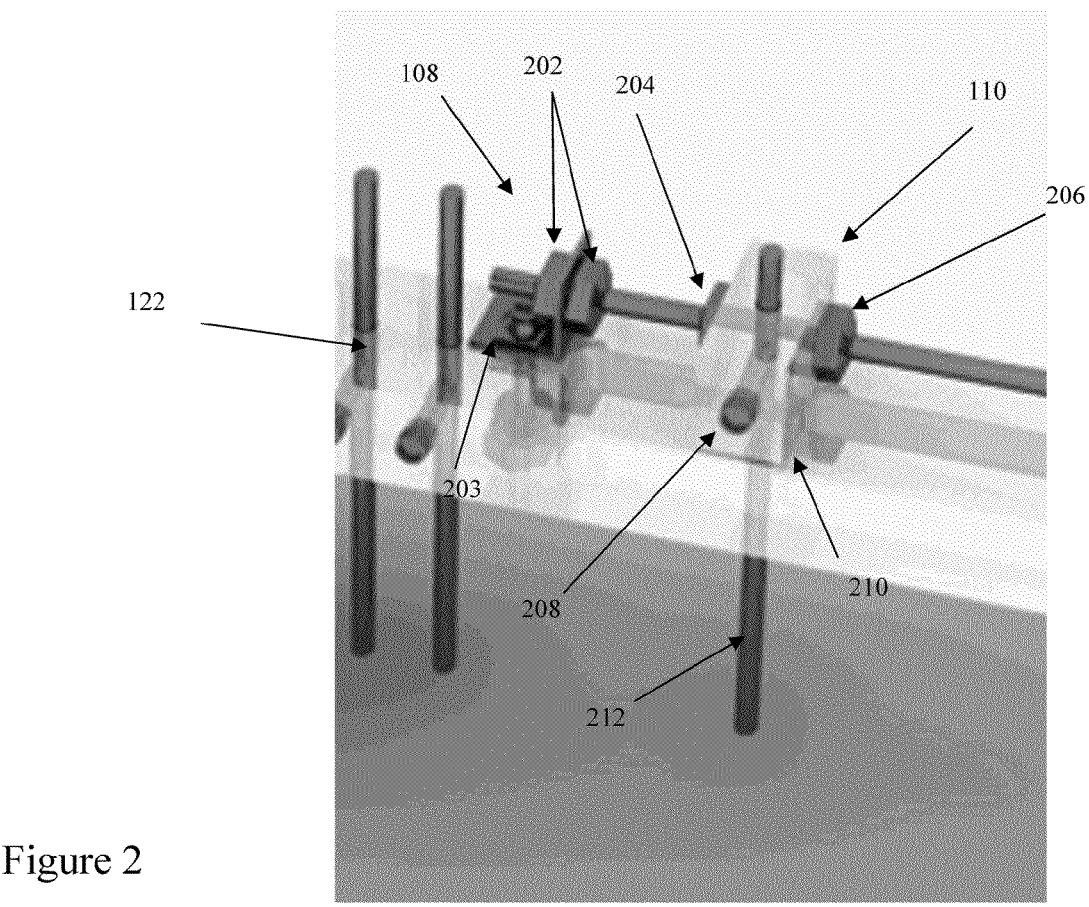
FIGS. 2 and 3 show close ups of portions of the exemplary embodiment.
Figure 3:
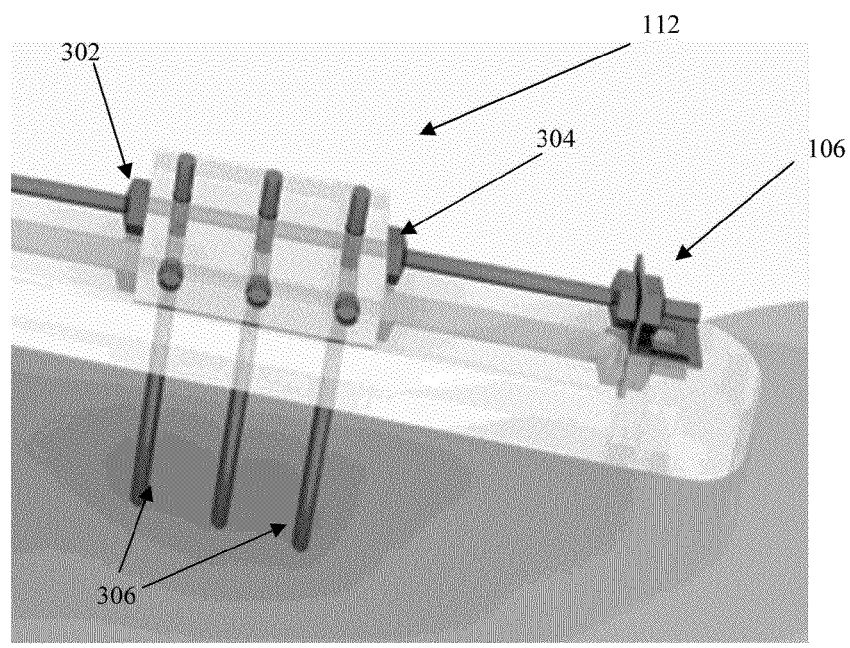

As seen in FIGS. 2 and 3, the one or more carriages (110, 112) consist of similar elements. Looking at the first carriage 110, we see straddling the slot 116, placed over the p-member surface 210, permitting the movement of the carriage along the length of the rail 114. The carriage has a lengthwise smooth opening for the rail to pass through. This opening is not threaded, or meant in any way to provide advancement force for the carriage, but is there to provide guidance. In an alternate embodiment, the opening (as well as any of the other surgical pin openings in either the carriage or the members), may be sheathed or lined with a low friction material sleeve along all or portions of its length. In other embodiments, grease may also be used.

Note that contact between the carriages and the elongated member may or may not be desired, by clinician selection of the carriage. When contact is desired, it is slight, and meant to ensure that no moment of rotation if induced into the pin or pins secured to the bone.

The carriage secures one or more surgical pin 212, with a set screw 208, fixing the height over the patient skin of the assembly. In this embodiment, the position of the complete assembly above the patient is fixed by the tension on the surgical pins 212 attached to it.

In an alternate embodiment, the carriage is shaped so that it makes contact with both the upper portion of the p-member and the lower portion also. This may be accomplished by having a lower carriage that is secured to the same surgical pins 212 as the upper carriage, but has a smooth lower rail, not threaded like the upper one 114. In an alternate embodiment, the lower carriage is free of a rail, simply sandwiching the upper portion. In yet another embodiment, a simple set screw is used.

In one embodiment, the rail 114 is secured at either end by attachment assemblies (106, 108), and held significantly parallel to the elongated member 102 surface. In the illustrative embodiment shown, this is accomplished by two nuts 202 on either end of an L-bracket 203, which is attached by a screw to the p-member 102. Alternate embodiments may use chemical means, or may make the assembly integral to the p-member 102 structure.

In one embodiment, a similar arrangement is used on both ends of the rail. In an alternate embodiment, one or more ends are formed as part of the p-member structure, either as a structural L-bracket made of a similar material to that of the elongated member, or as a complete assembly housing the rail and securing it against rotation. In an alternate embodiment, the rail 114 is in a higher position at one end relative to the other, allowing for a gradual "raising" of the bone structure.

In one embodiment, the rail 114 is made secure and impeded from rotating. In this fashion, the coordinated simultaneous or sequential rotation of devices such as the (204, 206) will result carriage displacement control means along the rail in either direction. In one embodiment, wing nuts are used (easier for the patient to adjust without tools), tee nuts and others may also be used. These nuts may be made of metal, plastic (including nylon) or any other suitable material.

Depending on direction of travel, the trailing nut will act as the "pusher" of the carriage, while the leading one acts as a "brake". When advancing the carriage, the patient or clinician loosens the leading one, advances the trailing one (hence pushing the carriage the desired distance), and then secures both.

In one embodiment, and to allow for patient therapy, the thread of the rail 114 is matched to the nut, so that a half rotation of the nut every so many hours will yield the desired 1 mm/day correction.

In one example, the top of the nut is colored black, the bottom white, and the patient is told to tighten the nut so the white portion of the nut is on top at 8 am, and to repeat at 8 pm so the black dot is on top. Similarly, the nut to "other" nut is painted white completely, so that the patient knows which to turn. In an alternate embodiment, only the nut providing the compression is color coded as described above.

In an alternate embodiment, the side of the elongated member facing the patient is marked with advancement marks (daily, weekly, monthly, goal), to ensure that at determined intervals the patient knows to contact the clinician.

In an alternate embodiment, the nuts are built into the carriage, and the above operations performed by providing the patient with other special tools. Such may be the case when an acme screw, jack screw, or other type of built in displacement medium is used, and the carriage has built into it the appropriate mechanism.

In yet another embodiment, the carriage control means are comprised of a powered screw jack, powered acme screw jack or other lead screw motor mechanism with communication capabilities (or even a built-in), tamper proof timing mechanism. This would allow for the commanded (preferably through wireless control) and/or automated advancement of the screw. In this fashion, the patient would be able to be treated without their direct involvement.

In yet another embodiment, the carriage control means has the unit performing the screw displacement designed to be attached to the carriage only when the patient is directed to do so, and meant to be in a separate charger the rest of the time. This would allow for control by the clinician (and trust by the patient!), as well as an element of telemedicine.

In an alternate embodiment, the shape of the p-member is not straight, but curved as desired by the surgeon. In this fashion, the bone may not only be adjusted in length (along the proximal to distal distance of the p-member), but also along its pitch and yaw axes. Similarly, the p-member may be curved up or down along its length, so that the farther the carriage(s) travel along it, the more the bone will be lifted or sunk.

Figure 4:
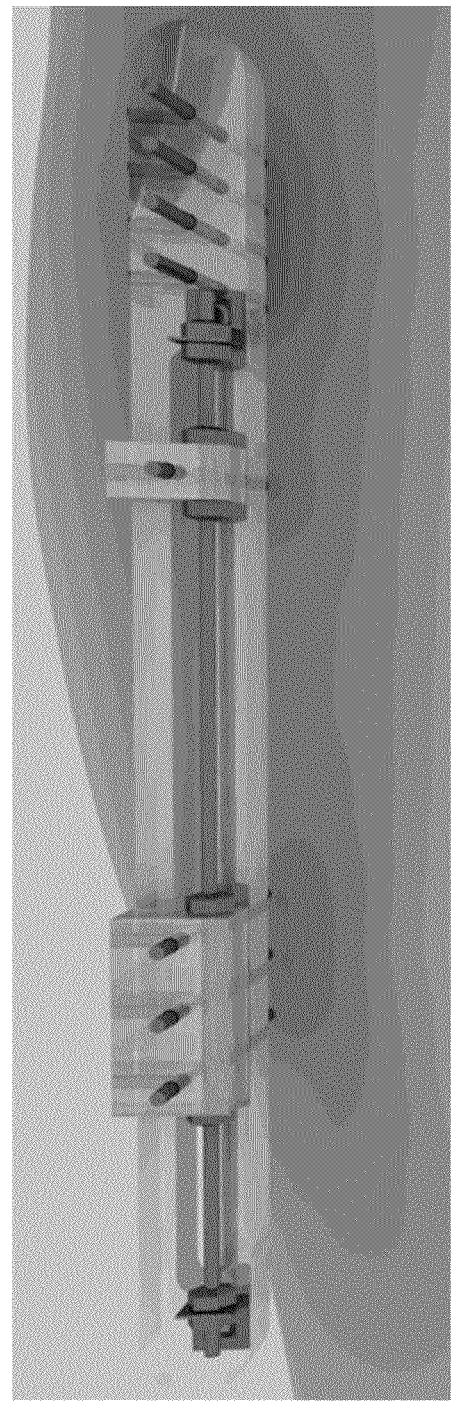
FIG. 4 shows an illustrative embodiment of the invention attached to a human, from a top view perspective.

When more than one carriage is used, the second carriage 112 is placed farther along the length of the p-member 102. As with the first carrier, one or more surgical pins 306 are securely attached with set screws or other suitable means to the carriage. The translation of the carriage is again controlled by the coordinated adjustment of the nuts (302, 304) or other carriage translation mechanism. FIG. 4 shows an illustrative embodiment of the invention attached to a human, from a top view perspective. The use of multiple carriages allows for the additional adjustment in height by either using different shaped carriages, or not setting them at the same height above the dermis).

Note that the rail 114 is slightly offset from the slot 116 in order for the pin top to comfortably clear it. In an alternate embodiment, a second rail without any nuts or other advancement mechanism may be mounted on the other side of the slot to provide symmetric balance. In an alternate embodiment, one or more rails may be added to the lower side.

FIGS. 5, 6, 7 and 8 illustrate an embodiment of the invention for treatment of forearm and/or wrist injuries. Designed to connect to the Radius and Ulna bones, the unit in effect utilizes a triangle of three connections to two of these bones, creating a triangle upon which a multi-axis force can be applied by adjustment of tension/compression on the unit's one or more carriages 504.

Figure 5:
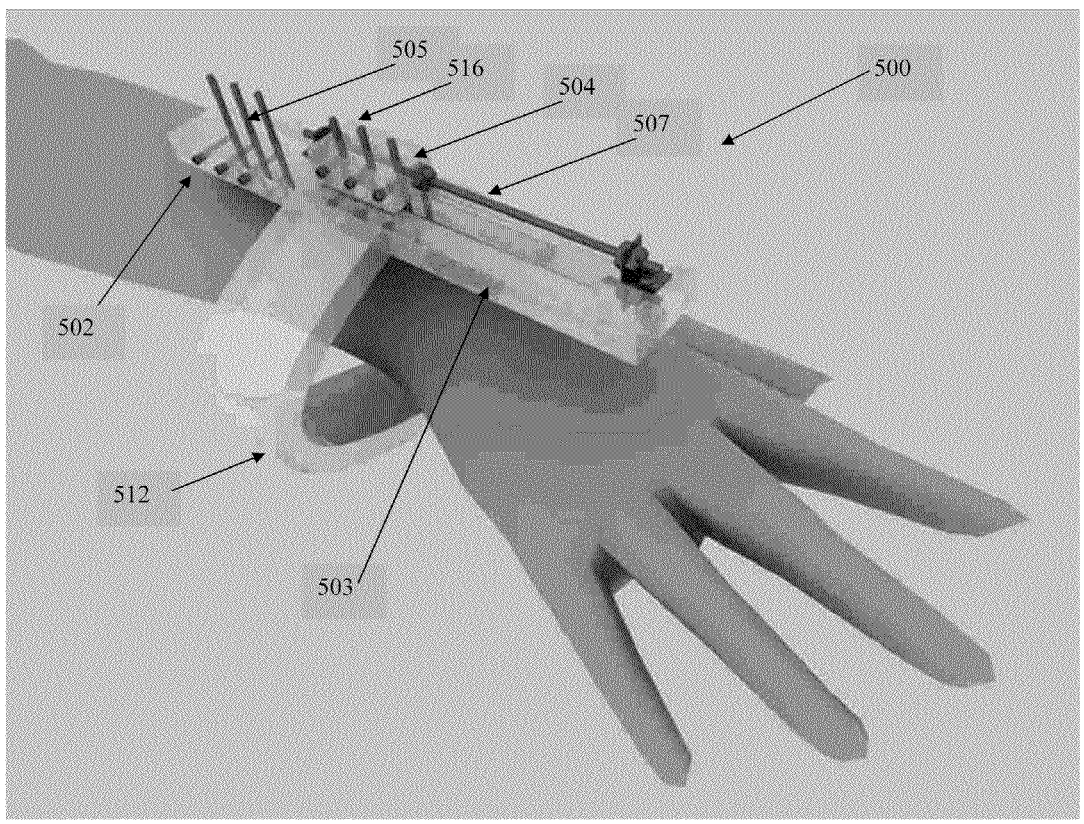
FIGS. 5 and 6 show illustrative embodiments of the invention attached to a human forearm.
Figure 6:
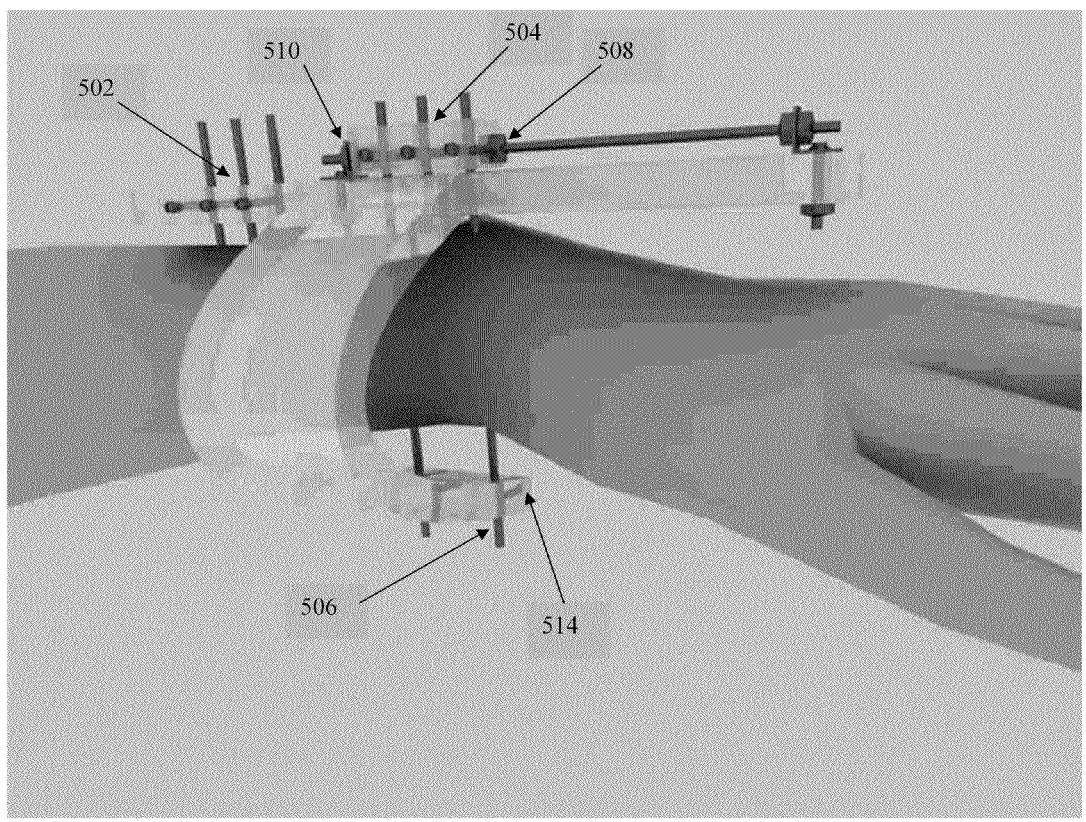

In one embodiment, seen in FIGS. 5 and 6, the unit's elongated member 503 is again anchored at its proximal end or base 502 to the bone, via one or more surgical pins 505, as shown in the previous embodiments shown in some of the previous figures. In one embodiment, one or more second elongated anchoring structures 512 protrude from the first elongated structure 102 (be the sides, top or bottom), and contain their own pin securing mechanisms along their length as well as close to their distal end.

A second set of one or more fixed pins 506 are placed so as to protrude on the other side of the patient's hand, and are secured via set screws 514 to the other end of the fixed arch 512. Note that this secondary structure is mean to protrude from a fixed location. In embodiment this structure is made from the same material as the first elongated one (may even be molded as a single piece). In an alternate embodiment, it is mechanically or chemically affixed to the first elongated member.

In the above fashion, the p-member 503 allows adjustments in its pitch, roll and yaw axes in relation to the hand-forearm axis. These two points form the base of a triangle. As before, one or more carriage(s) 504 is attached through set screw or other affixing means to the surgical pins 516 attached to a third bone (may be the separated portions of the radius, the ulna, as well as all or parts of the carpus, the falanges or others nearby bone structures). This final connection to the patient provides the final point of the triangle, once that is displaced as the treatment occurs. As in the previous system, the carriage 504 may be placed in compression or tension by adjusting the nuts (508, 510), in a fashion similar to that used by the system discussed in FIGS. 1-4.

Figure 7:
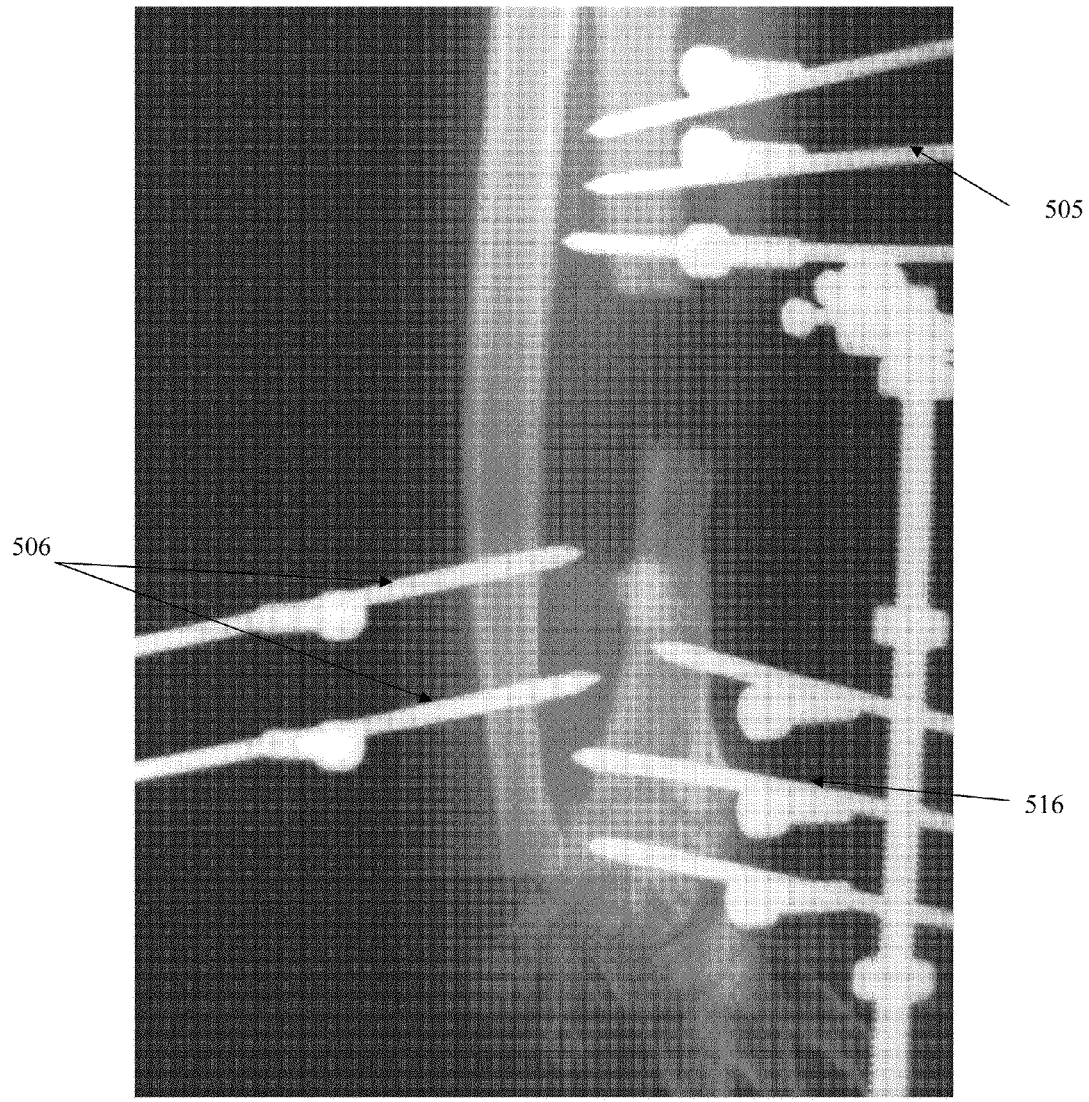
FIGS. 7 and 8 illustrate the system attached to a human forearm as seen in an X-ray.
Figure 8:
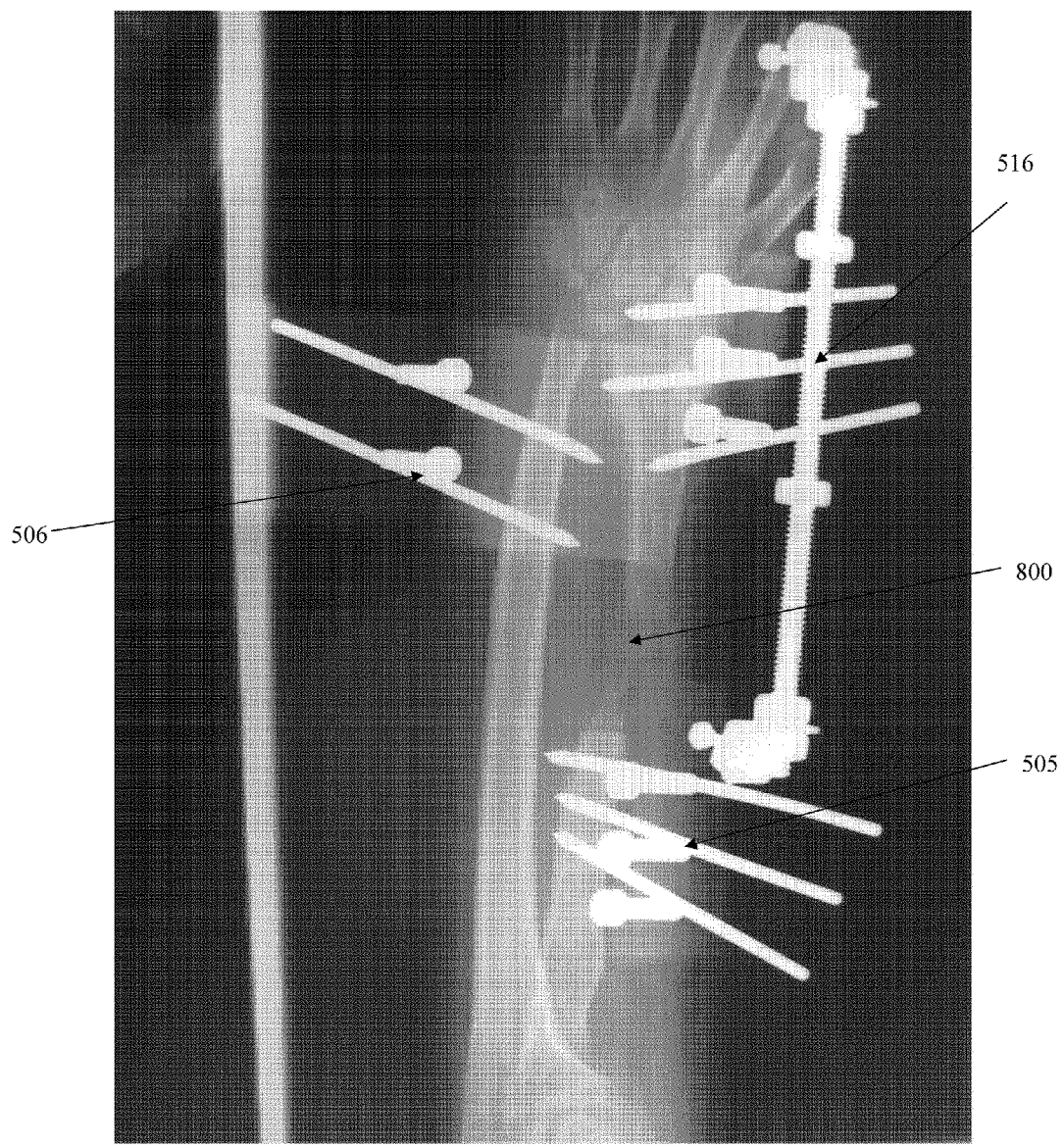

FIGS. 7 and 8 illustrate the effect of the unit on the Radius and Ulna bones over time, in particular the commanded growth 800 of the bone correction area.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A distraction system comprising;
a rigid elongated member having openings and pin securing means for anchoring to one or more surgical pins near its proximal end, one or more slots along its length, and moment of rotation elimination surfaces located outside the patient's body on both sides of said openings;
one or more non-rotating rails secured to said elongated member, said rails being offset along their longitudinal axis to one side along the length of one or more of said slots;
one or more carriages secured to one or more said non-rotating rails, said carriages having openings and securing means for attaching to one or more surgical pins and sliding along said rigid member moment of rotation elimination surface; and
one or more carriage displacement control means per carriage.

2. The system of claim 1 wherein;
the securing means for attaching to one or more surgical pins are comprised of set screws.

3. The system of claim 2 wherein;
the carriage displacement means are comprised of nuts.

4. The system of claim 3 wherein;
the rail and nut threads are selected so that half a rotation corresponds to a 1 mm linear advance by the carriage.

5. The system of claim 2 wherein;
the carriage displacement means are comprised of wing nuts.

6. The system of claim 2 wherein;
the carriage displacement means are comprised of an electromechanical assembly with electronic controls.

7. The system of claim 1 further comprising;
one or more secondary elongated structure protruding from the first, said secondary members being rigid and having openings and securing means for anchoring to surgical pins near their distal ends.

8. A method for providing bone distraction comprising;
providing a rigid elongated member having openings and pin securing means for anchoring to surgical pins near its proximal end, one or more slots along its length, and moment of rotation elimination surfaces external to the patient's body on both sides of said openings;
providing one or more non-rotating rails secured to said elongated member, offset to one side along the length of one or more of said slots and outside said patient's body;
providing one or more carriages secured to one or more said rails, said carriages having openings and securing means for attaching to one or more surgical pins and supported on each side of said elongated member by said moment of rotation surfaces; and
providing one or more carriage displacement control means per carriage.

* * * * *